United States Patent [19]

Kuhn

[11] 4,002,987
[45] Jan. 11, 1977

[54] CIRCUIT ARRANGEMENT FOR LIMITING THE TRANSMISSION SPEED OF DATA SIGNALS

[75] Inventor: Wolfgang Hans Kuhn, Munich, Germany

[73] Assignee: Siemens Aktiengesellschaft, Munich, Germany

[22] Filed: June 10, 1975

[21] Appl. No.: 585,495

[30] Foreign Application Priority Data

June 12, 1974  Germany ............................ 2428367

[52] U.S. Cl. .............................. 328/138; 328/140; 328/207; 307/215
[51] Int. Cl.² ........................................ H03D 3/00
[58] Field of Search ................... 328/138, 140, 207; 307/215

[56] References Cited

UNITED STATES PATENTS

| 3,304,372 | 2/1967 | Filipowsky et al. | 328/138 X |
|---|---|---|---|
| 3,413,490 | 11/1968 | Breunig et al. | 328/140 X |
| 3,588,711 | 6/1971 | Antoszewski | 328/140 |
| 3,588,718 | 6/1971 | Diso | 328/140 |
| 3,820,032 | 6/1974 | Schlaeppi | 328/140 X |

Primary Examiner—John S. Heyman

[57] ABSTRACT

A circuit arrangement for limiting the transmission speed of binary data signals is described. A first input is supplied with associated element pulse trains which have a given pulse duration when their repetition frequency is equal to a given limit frequency. When the repetition frequency does not exceed a predetermined limit frequency, binary signals corresponding to the data signals are emitted. A first time stage, supplied with the element pulse trains, emits a first signal having a duration equal to the durations of the pulses in the element pulse trains at the predetermined limit frequency. If the aforementioned first signal occurs between two pulses of the element pulse train, a second time stage, which is supplied with the first signal, and element pulse trains, produces a second signal. The duration of the latter signal is greater than durations of the element pulse train. A blocking stage blocks the emission of binary output signals when the second signal occurs.

4 Claims, 2 Drawing Figures

CIRCUIT ARRANGEMENT FOR LIMITING THE TRANSMISSION SPEED OF DATA SIGNALS

BACKGROUND OF THE INVENTION

The invention relates to a circuit arrangement for limiting the transmission speed of binary data signals, wherein a first input is supplied with the data signals and a second input is supplied with associated element pulse trains, which have a fixed pulse duration when their repetition frequency is equal to a given limit frequency. The binary output signals corresponding to the data signals are emitted at an output when the repetition frequency of the element pulse trains does not exceed a given limit frequency.

In the pulsed transmission of data, the transmission speed of the data signals is determined by the repetition of the element pulse train belonging to the data signals. If the repetition frequency of the element pulse train is not limited, a circuit arrangement is required which blocks the emission of data signals when the repetition frequency of the element pulse trains exceeds a given limit frequency.

German Auselgeschrift No. 1,804,719 discloses a circuit arrangement for the monitoring of data signals. With the aid of this circuit arrangement, the form of the data signals is compared with a form determined by a tolerance plan, and those data signals are recognized as being faulty which exceed the inner or outer limit of the tolerance plan. However, this circuit arrangement is not suitable for limiting the transmission speed of data signals, because it recognizes as faulty all data signals whose transmission speed is greater than or lower than a transmission speed established by the tolerance plan.

A circuit arrangement has previously been proposed for limiting transmission speed of data signals. In this circuit arrangement the element duration of the data signals is compared with a theoretical element duration. Data signals whose element duration is shorter than the theoretical element duration are, in this circuit arrangement, lengthened to the theoretical element duration. Thus, this circuit arrangement emits signals even when the transmission speed of the data signals exceeds a transmission speed assigned to the theoretical element duration at its input. Also, the circuit arrangement is provided for data signals which are transmitted in a nonpulsed fashion.

An object of the invention is to provide a circuit arrangement for limiting the transmission speed of binary data signals capable of blocking data signals in case the repetition frequency of the associated element pulse train exceeds a given limit frequency.

SUMMARY OF THE INVENTION

In accordance with the invention the aforementioned and other objects are realized in the circuit arrangement of the type described hereinabove by a first time stage which is supplied with the element pulse trains and which emits a first signal whose duration is equal to the pulse durations of the element pulse train at the given limit frequency. A second time stage is supplied with the element pulse trains and with the first signal, and if the first signal occurs between two pulses of the element pulse train, the second time stage produces a second signal whose duration is greater than the period duration of the element pulse train which is assigned the limit frequency. A blocking stage which is supplied with the data signals and with the second signal blocks the emission of the ouput signals when the second signal occurs.

The circuit arrangement in accordance with the invention has the advantage that the limit frequency can be set very simply through the duration of the first and second signals and can readily be changed over to different limit frequencies. It can be constructed in space-saving fashion and favorably from the point of view of costs with the aid of commercially available integrated circuits. It also has the advantage that the blockage of the data signals is terminated without manual intervention as soon as the given transmission speed is exceeded.

To ensure that the circuit arrangement operates satisfactorily even when the period duration of the element pulse train is shorter than the duration of the first signal, it is advantageous to provide as first time stage a first monostable circuit which may be triggered both before and after the expiration of its delay time.

To ensure a constant blockage of the output signal even when the repetition frequency of the element pulse train is greater than the given limit frequency during a length of time which exceeds the duration of the second signal, it is advantageous for the second time stage to contain a second monostable circuit which may be triggered both before and after the expiration of its delay time.

If the first signal is emitted as inverted signal, and thus, assumes the binary value 0 for a length of time which is equal to the pulse duration of the element pulse trains at the given limit frequency, it is advantageous to precede the second monostable circuit by a NOR gate which is supplied with the element pulse trains and the first signal.

If the second signal is emitted in the form of an inverted signal, and thus assumes the binary value 0 for a length of time which is greater than the period duration of the element pulse trains assigned to the limit frequency, the blockage of the output signal is achieved with particularly low expense if the blocking stage includes an AND gate which is supplied with the data signal and the second signal and which emits the binary output signal.

The duration of the first signal and of the second signal is set or changed in a simple fashion if the first and second time stage each contain, respectively, a first and second resistor whose resistance values are variable and each contain, respectively, a first and second capacitor.

BRIEF DESCRIPTION OF THE DRAWINGS

In the following a preferred embodiment of a circuit arrangement in accordance with the invention will be described in detail making reference to drawings, in which.

DETAILED DESCRIPTION OF THE DRAWINGS

Figure 1:
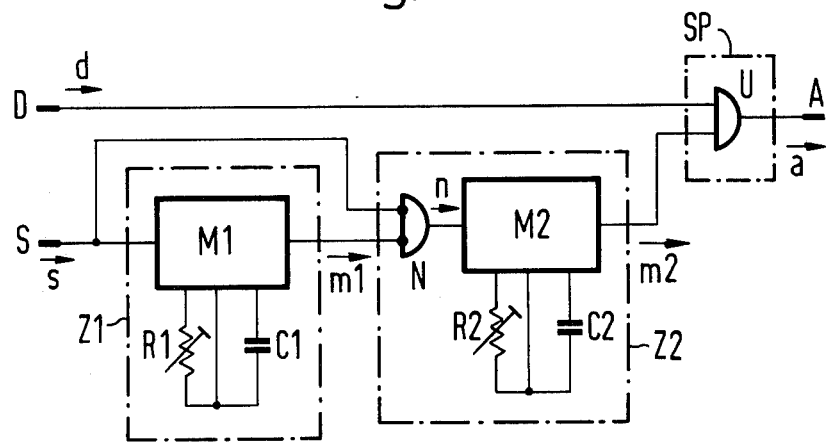
FIG. 1 shows a circuit diagram of the inventive circuit arrangement.

The circuit arrangement illustrated in FIG. 1 which serves to limit the transmission speed of binary data signals contains two time stages Z1 and Z2 and a blocking stage SP. The time stage Z1 comprises a monstable switching circuit M1 with an associated capacitor C1 and variable resistor R1. The time stage Z2 comprises a NOR gate N and a monostable switching circuit M2 which is connected to the output of the NOR gate, with an associated capacitor C2 and an associated variable resistor R2. The blocking stage SP comprises an AND gate U.

The circuit arrangement is supplied via a first input S with an element pulse train $s$ and via a second input D with a data signal $d$ belonging to the element pulse train $s$. At its output A, the circuit arrangement emits binary output signals $a$ whose binary values correspond to those of the data signals $d$ when the transmission speed of the data signals $d$ is lower than a given transmission speed. If the transmission speed is greater than this given transmission speed, no output signals $a$ are emitted at the output A.

Further details of th circuit arrangement will be described together with the time diagrams shown in FIG. 2.

Figure 2:
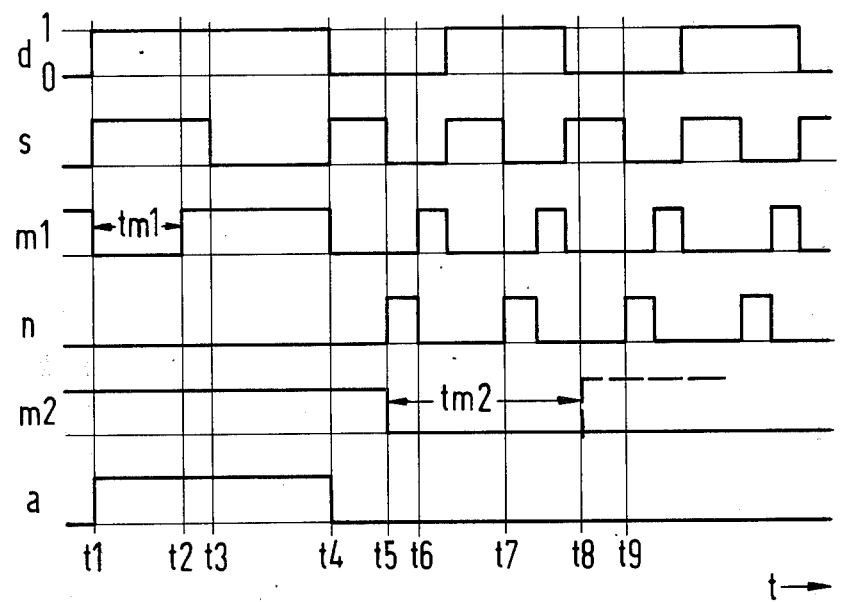
FIG. 2 is time-waveform diagrams of signals at various points of the circuit arrangement.

FIG. 2 illustrates time diagrams of signals which arise during the operation of the circuit arrangement illustrated in FIG. 1. The time $t$ is plotted along the abscissa, and the amplitudes of the signals are plotted along the ordinate. As all the signals are binary signals, they will only assume the binary values referenced 0 and 1.

FIG. 2 shows the data signal $d$ and the associated element pulse train $s$ which are applied to the circuit arrangement at the inputs D and S. It will be assumed that the data signal $d$ changes its binary value whenever the element pulse train $s$ changes its binary value from 0 to 1. In addition it will be assumed that the element pulse train $s$ has a pulse duration which is equal to half its period duration and that until the time $t4$, the repetition frequency of the element pulse trains $s$ is shorter than the limit frequency. After the time $t4$, the repetition frequency is greater than the limit frequency. Also, FIG. 2 shows signals $m1$ and $m2$ which occur, respectively, at the outputs of the time stages Z1, Z2, a signal $n$ which is emitted at the output of the NOR element N, and the output signal $a$.

At the time $t1$, the element pulse train $s$, and the data signal $d$ change their binary value from 0 to 1. The monostable circuit M2 is in its stable state, and the signal $m2$ has the binary value 1. Via the AND gate U in the blocking stage SP, the data signal $d$ is switched through to the output A, and the output signal $a$ likewise assume the binary value 1. At the same time, the element pulse train $s$ triggers the monostable circuit M1 into its unstable state, and the signal $m1$ assumes the binary valve 0. The delay time $tm1$ of the monostable circuit M1 is set by the variable resistor R1 and the capacitor C1 in such manner that it is equal to the pulse duration of those element pulse trains $s$ whose repetition frequency is equal to that limit frequency which corresponds to the given transmission speed of the data signals $d$.

At the time $t2$, the delay time $tm1$ has expired, the monostable circuit M1 switches back into its stable state and the signal $m1$ assumes the binary value 1. Shortly thereafter, the element pulse train $s$ assumes the binary value 0 at the time $t3$.

At the time $t4$, the element pulse train $s$ again changes its binary value from 0 to 1. At the same time, the data signal $d$ and the output signal $a$ change their binary values from 1 to 0. Also, the monostable circuit M1 is switched into its unstable state. Since it has been assumed that after the time $t4$ the transmission speed of the data signals $d$ is greater than the given transmission speed, th element pulse train $s$ changes its binary value back from 1 to 0 at the time $t5$. Because the signal $m1$ still has the binary value 0, the signal $n$ at the output of the NOR gate assumes the binary value 1. This signal $n$ is conducted to the monostable circuit M2, and the latter is triggered into its unstable state. The signal $m2$ assumes the binary value 0 and blocks the AND gate U in the blocking stage SP. Thus, no output signal $a$ is emitted at the output A.

The delay time $tm2$, following which the monostable circuit M2 switches back into its stable state, is set by means of variable resistor R2 and cpacitor C2 in such manner that it is greater than the period duration of those element pulse trains $s$ whose repetition frequency is equal to the limit frequency corresponding to the given transmission speed of the data signals $d$.

At the time $t6$, the monostable circuit M1 switches back into its stable state, and the signal $n$ asumes the binary value 0. Similarly, as at the time $t5$, the element pulse train $s$ reassumes the binary value 0 at the time $t7$. Since the monostable circuit M2 may be retriggered, and has not yet switched back into its stable state, the delay time $tm2$ is released again. O therwise, at the time $t8$, after the delay time $tm2$, the monostable circuit M2 would have triggered back into its stable state.

At th time $t9$, the signal $n$ changes its binary value back from 0 to 1 and re-releases the delay time $tm2$. This process is repeated until the transmission speed of the data signals $d$ is again lower than the given transmission speed, and thus, no more signals $n$ are produced. The monostable circuit M2 is then switched back into its stable state, and as a result of the signal $m2$ at the output of M2, the blocking stage SP is again opened. The data signal $d$ is thus switched through from the input D to the output A of the circuit arrangement, and the binary values of output signal $a$ again correspond to those of the data signal $d$.

Due to the use of a monostable switching circuit M1, ahe circuit arrangement also blocks those data signals $d$ wherein the period duration of the element pulse trains $s$ is shorter than the delay time $tm1$.

The circuit arrangement even blocks data signals $d$ when the pulse duration of the element pulse trains $s$ is not equal to half the period duration. Also, in this case it must be ensured that the delay tine $tm1$ is set to be such that it is equal to the pulse duration of those element pulse trains $s$ whose repetition frequency is equal to the limit frequency corresponding to the given transmission speed.

If the circuit arrangement is to block those data signals $d$ whose transmission speed is lower than the given transmission speed, the signal $m2$ is conducted to the blocking stage SP in inverted form. In this case the circuit arrangement emits output signals $a$ only when the repetition frequency of the element pulse train $s$ is greater than the limit frequency and thus the signal $m2$ has the binary value 0.

The principles of the invention are described hereinabove by describing the construction and operation of a preferred embodiment. It is contemplated that the described embodiment is only exemplary and that it can be modified or changed while remaining within the scope of the invention as defined by the appended claims.

I claim:

1. In apparatus for limiting the transmission speed of binary data signals wherein a first input to the apparatus is supplied with the data signals and a second input is supplied with associated element pulse trains which have a predetermined pulse duration when their repetition frequency is equal to a predetermined limit frequency and wherein binary outut signals corresponding to said data signals are emitted when said repetition frequency does not exceed said limit frequency, the improvement comprising:

a first timing means having inputs for receiving said element pulse trains and for producing a first signal having pulse durations equal to the pulse durations of said element pulse trains at said predetermined limit frequency.

second timing means having inputs for receiving said element pulse trains and said first signal for producing therefrom, if said first signal occurs between two pulses of said element pulse trains, a second signal having pulse durations greater than those of said element pulse train corresponding to said predetermined limit frequency and gate means supplied with said data signals and said second signal for blocking the binary data signal output when said second signal occurs.

2. The apparatus defined in claim 1 wherein said first timing means is a first monostable switching circuit which is triggerable both before and after the expiration of its delay time.

3. The apparatus defined in claim 1 wherin said second timing means comprises a NOR gate connected to receive said first signal and said element pulse trains and having an output connected to a second monostable switching circuit, which is triggerable both before and after expiration of its delay time for producing said second signal.

4. The apparatus defined in claim 1 wherein said gate means comprises an AND gate.

* * * * *